US011523588B2

(12) United States Patent
Davis

(10) Patent No.: US 11,523,588 B2
(45) Date of Patent: Dec. 13, 2022

(54) DEVICE FOR DIRECTING A PET'S GAZE DURING VIDEO CALLING

(71) Applicant: Andrew Peter Davis, Bellevue, WA (US)

(72) Inventor: Andrew Peter Davis, Bellevue, WA (US)

( * ) Notice: Subject to any disclaimer, the term of this patent is extended or adjusted under 35 U.S.C. 154(b) by 367 days.

(21) Appl. No.: 16/445,192

(22) Filed: Jun. 18, 2019

(65) Prior Publication Data

US 2019/0380303 A1 Dec. 19, 2019

Related U.S. Application Data

(60) Provisional application No. 62/736,525, filed on Jun. 18, 2018.

(51) Int. Cl.
*A01K 5/02* (2006.01)
*A01K 29/00* (2006.01)

(52) U.S. Cl.
CPC ............ *A01K 5/025* (2013.01); *A01K 29/005* (2013.01)

(58) Field of Classification Search
CPC ...... A01K 5/025; A01K 15/02; A01K 15/021; A01K 5/02
USPC ...................................................... 119/51.02
See application file for complete search history.

(56) References Cited

U.S. PATENT DOCUMENTS

| | | | | |
|---|---|---|---|---|
| 4,279,221 A * | 7/1981 | Arvizu | ................. | A01K 5/0291 119/51.11 |
| 5,259,337 A * | 11/1993 | Rasmussen | .......... | A01K 5/0275 119/57.1 |
| 5,479,879 A * | 1/1996 | Biek | .................. | A01K 39/0113 119/52.2 |
| 5,613,464 A * | 3/1997 | Petzel | .................... | A01K 5/025 119/55 |
| 7,040,249 B1 * | 5/2006 | Mushen | ............... | A01K 5/0225 119/51.5 |
| 7,263,953 B2 * | 9/2007 | Sundararajan | ....... | A01K 5/0275 119/496 |
| 7,458,336 B2 * | 12/2008 | Eu | .......................... | A01K 1/033 119/163 |

(Continued)

FOREIGN PATENT DOCUMENTS

| | | |
|---|---|---|
| WO | 2014/143594 | 9/2014 |
| WO | 2014/162154 | 10/2014 |

OTHER PUBLICATIONS

International Search Report and Written Opinion of the International Searching Authority dated Sep. 5, 2019, in International Patent Application No. PCT/US2019/037822, 6 pages.

*Primary Examiner* — Brady W Frazier
*Assistant Examiner* — Madison Elizabeth Dittner
(74) *Attorney, Agent, or Firm* — Lowe Graham Jones PLLC

(57) ABSTRACT

A pet interaction device is described. In some examples, the device includes a housing having an opening, and a treat dispenser configured to deliver a treat to a shelf within the housing or other target area visible from the outside by a pet that looks through the opening. The device also includes a camera having a lens that is oriented to provide the camera with a view from the inside of the housing outwards through the opening. The treat dispenser delivers a treat onto the shelf where it is visible to the pet through the opening, such that the camera will have a view of the pet as it gazes at the treat on the shelf.

22 Claims, 4 Drawing Sheets

(56) References Cited

U.S. PATENT DOCUMENTS

| | | | |
|---|---|---|---|
| 8,578,882 B2* | 11/2013 | Araujo | A01K 15/02 |
| | | | 119/51.01 |
| 8,588,968 B2* | 11/2013 | Carelli | A01K 15/021 |
| | | | 700/244 |
| 8,633,981 B2* | 1/2014 | Russoniello | A01K 15/025 |
| | | | 348/114 |
| 9,049,840 B1* | 6/2015 | Parness | A01K 5/0233 |
| 9,226,477 B2 | 1/2016 | Davis | |
| 9,295,231 B2* | 3/2016 | Parness | A63F 9/0601 |
| 9,848,578 B2* | 12/2017 | Miller | A01K 15/025 |
| 10,721,912 B2* | 7/2020 | Hanson | A01K 5/02 |
| 2005/0061252 A1* | 3/2005 | Meeks | A01K 5/0114 |
| | | | 119/51.02 |
| 2008/0060582 A1* | 3/2008 | Painter | A01K 5/0233 |
| | | | 119/53.5 |
| 2012/0024237 A1* | 2/2012 | Rice | A01K 15/027 |
| | | | 119/703 |
| 2014/0083364 A1* | 3/2014 | Anderson | A01K 5/01 |
| | | | 119/51.01 |
| 2014/0090601 A1* | 4/2014 | Stone | A01K 5/0114 |
| | | | 119/51.01 |
| 2015/0327514 A1* | 11/2015 | Clark | G08C 17/02 |
| | | | 119/57.92 |
| 2016/0007565 A1* | 1/2016 | Trottier | A01K 5/0114 |
| | | | 119/51.02 |
| 2016/0120150 A1* | 5/2016 | Mullin | H04Q 9/00 |
| 2016/0295832 A1 | 10/2016 | Trottier et al. | |
| 2017/0099804 A1* | 4/2017 | Chang | H04Q 9/00 |
| 2017/0280674 A1 | 10/2017 | Davis | |

\* cited by examiner

DEVICE FOR DIRECTING A PET'S GAZE DURING VIDEO CALLING

PRIORITY CLAIM

This application claims priority from U.S. Provisional Patent Application No. 62/763,525, filed Jun. 18, 2018, and entitled "Device And Method For Directing Pet's Gaze During Webcam And Video-Calling," the content of which is incorporated herein by reference.

FIELD OF THE INVENTION

This application describes techniques and devices for capturing and directing the gaze of a pet during a video call, such as one that may be performed by a pet interaction device.

BACKGROUND OF THE INVENTION

It is known to be difficult to get a dog or a baby to look at a camera when recording video or pictures. A brightly colored toy works for a baby, and a small treat can help direct the dog's attention. U.S. Pat. No. 9,226,477 describes an Internet Canine Communication System that includes a video camera for Internet-based, live video interaction with a pet, such as a dog. As many pets do not have long attention spans, it can be difficult to get the pet to gaze into the video camera during the duration of a video call. A device and method to train a pet to look at the camera during such remote live video and/or still photos would make the device far more intimate and appealing.

The invention described below trains a dog or other pet to look towards the camera when using a device which allows live video and remote treat dispensing.

SUMMARY OF THE INVENTION

One embodiment provides a pet interaction device that includes a treat staging area that is viewable by but not physically accessible to a pet, a camera having a lens that is directed to a pet viewing area, a treat dispenser configured to deliver a treat to the treat staging area, and logic configured to, in response to a received command, cause the treat dispenser to deliver a treat to the staging area, such that the camera will have a view of the pet as it gazes at the treat.

Another embodiment provides a pet interaction device, including a housing having an opening, a treat dispenser configured to deliver a treat to a shelf within the housing, wherein the shelf is visible from the outside by a pet that looks through the opening, a camera having a lens that is oriented to provide the camera with a view from the inside of the housing outwards through the opening, and logic configured to, in response to a received command, cause the treat dispenser to deliver a treat onto the shelf where it is visible to the pet through the opening, such that the camera will have a view of the pet as it gazes at the treat on the shelf.

In alternative embodiments, a dish external to the housing and configured to receive a treat provided by the treat dispenser is provided, wherein the dish is positioned adjacent to the opening such that a pet that eats a treat from the dish is visible through the opening to the camera. There may also be a ramp configured to transport a treat from the shelf to the dish, wherein the shelf is operable by the pet to cause a treat held by the shelf to move onto the ramp, thereby causing the treat to slide down the ramp and into the dish. The device may include a spring that biases the shelf into a substantially horizontal position, wherein the ramp has a first end and a second end, wherein the first end is fixedly connected to the shelf, wherein downward pressure on the second end of the ramp causes the ramp to tilt downwards, thereby causing the treat to slide from the shelf onto the ramp at the first end and towards the second end and into the dish.

The device may include an input device that is operable by the pet and that, when operated, causes an actuator to move the treat from the shelf onto ramp. Alternatively, it may include an audio output device that is configured to produce a sound audible to the pet, wherein the sound notifies the pet of the presence of a treat on the shelf.

In an alternative embodiment, the logic may be configured to transmit image data obtained from the camera to a remote client device. The logic may further be configured to receive audio of a user's voice from the remote client device and play the audio via an audio output device of the pet interaction device. The logic may also be configured to receive a command from the remote client device and in response to the received command, play a sound that notifies the pet of the presence of a treat on the shelf Alternatively, the logic may be configured to receive a command from the remote client device and in response to the received command, cause the treat dispenser to deliver a treat to the shelf.

In yet an alternative embodiment, the invention may include a mobile computing device that is separate from the housing, wherein the housing includes a means for coupling the mobile computing device to the housing, such that the camera is positioned to view through the housing via an opening in the housing that is positioned opposite the opening in the housing. At least some of the logic may include instructions executing on the mobile computing device, and the instructions may be configured to control at least the treat dispenser and the camera. In one embodiment, the mobile computing device receives power from a power port of the pet interaction device.

In yet an alternative embodiment, the pet interaction device may include a housing having an opening, a treat dispenser configured to deliver a treat to a target area proximate to the housing, wherein the target area is visible from by a pet that looks through the opening, a camera having a lens that is oriented to provide the camera with a view from the inside of the housing outwards through the opening, and logic configured to, in response to a received command, cause the treat dispenser to deliver a treat to the target area where it is visible to the pet through the opening, such that the camera will have a view of the pet as it gazes at the treat. The device may further include an input device that is operable by the pet and that, when operated, causes an actuator to move the treat to the target area. It may also include an audio output device that is configured to produce a sound audible to the pet, wherein the sound notifies the pet of the presence of a treat in the target area. Alternatively, the logic may be configured to transmit image data obtained from the camera to a remote client device. The logic may also be configured to receive audio of a user's voice from the remote client device and play the audio via an audio output device of the pet interaction device. In another embodiment, the logic may be configured to receive a command from the remote client device, and in response to the received command, cause the treat dispenser to deliver a treat to the shelf.

In an alternative embodiment, a method is provided to train a dog to anticipate that treats will be displayed on the platform before they are given to the dog, thereby training the dog to look towards the platform and the camera lens while they are waiting for treats. A buzzer, bell, or other output device (e.g., speaker on a coupled mobile computing device) sounding before the delivery of the treat to the treat platform can facilitate training. A means to alter the treat delivery closer to the dog's mouth can facilitate the initial training and facilitate the dog learning the actions needed to gain access to the treats (for example, pushing down the treat dish in the embodiment of FIG. 2A).

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
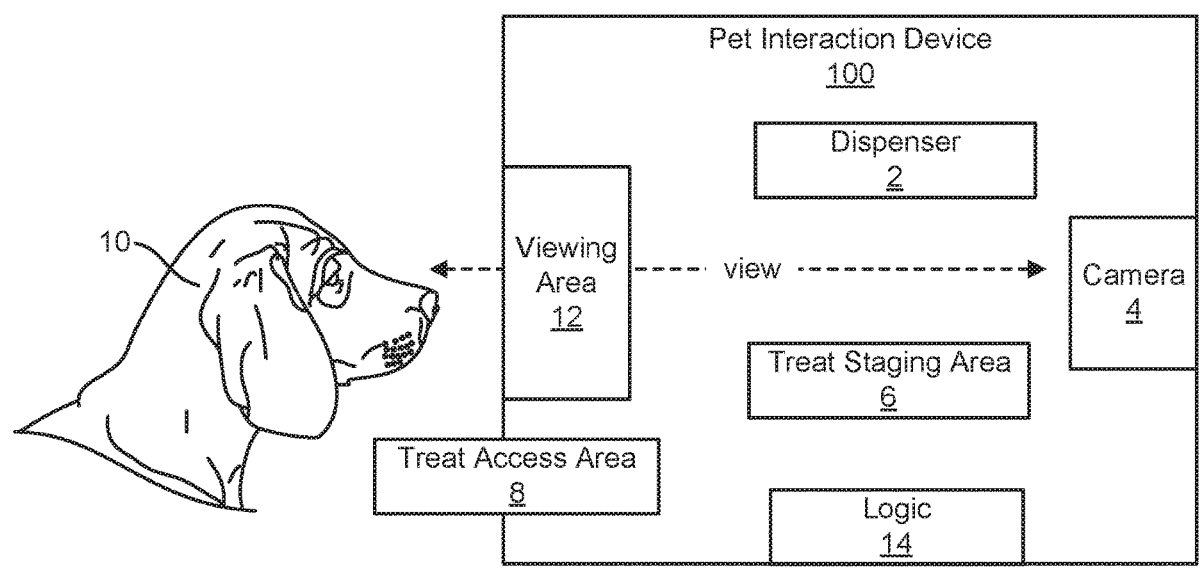
FIG. 1 is a block diagram of an example pet interaction device.

FIG. 1 is a block diagram of an example pet interaction device 100. The device includes a treat dispenser 2, a camera 4, a treat staging area 6, a treat access area 8, a viewing area 12, and logic 14. In response to a signal, command, or event, the dispenser 2 provides a treat (e.g., a pet biscuit or kibble) to the treat staging area 4. The dispenser 2 may provide treats in various ways, including by dropping the treat from above, via a conveyor belt, mechanical arm, or the like.

The treat staging area 6 is viewable by but not physically accessible to a pet 10. Various mechanisms may be employed to limit the pet's access to the area 6 including a plastic or glass window, a screen, OR the physical configuration of a housing for the device 100. For example, the device may have or include a tube or access opening that is sized such that the pet cannot push its head through it.

The device 100 gains the pet's attention when the treat is provided to the staging area 6. In some cases, the noise of the treat being provided to the staging area 6 attracts the pet's attention. For example, the sound of the treat landing on the area 6 or the sound of a motor or other actuator placing the treat on the area 6 will attract the pet's attention. In other embodiments, the device includes an audio output device (e.g., bell, speaker) that plays a sound to attract the pet's attention.

The camera 4 has a lens that is directed to and through a viewing area 12. The viewing area 12 allows the pet 10 to see the treat in or on the staging area 6. The viewing area 12 also allows the camera 4 to view the pet 10. The viewing area may be provided via a window or other type of transparent or semi-transparent opening in the device 100.

After interacting with the pet, such as by obtaining image or video data of the pet, the device 100 transports the treat from the staging area 6 to the treat access area 8. The treat access area 8 is a dish, platform, or similar device that holds the treat in a position that is accessible to the pet. In some embodiments, the device 100 does not include an access area 8 and instead ejects the treat from the device 100 into the air (perhaps to be caught by the pet) or onto the floor.

The treat may be delivered to the access area 8 in response to various inputs or events. For example, the device 100 may include an input device such as a button or lever that is operable by the pet and/or a human user and causes the treat to be moved from the staging area 6 to the access area 8. Other or additional input devices may be provided that similarly invoke other functions of the device 100. Inputs may also be received from remote sources, such as remote control devices, mobile applications, or the like.

The logic 14 includes hardware and/or software that executes to perform or invoke functions of the device 100. As will be described in more detail below, the device 100 may be configured to perform other or additional functions, including interacting with remote devices to receive commands (e.g., to drop the treat, to notify the pet) and/or data (e.g., audio or video of the pet's owner) and/or transmit data obtained by the device 100, including audio or image data (still or moving pictures) obtained by the camera 4.

Figure 2A:
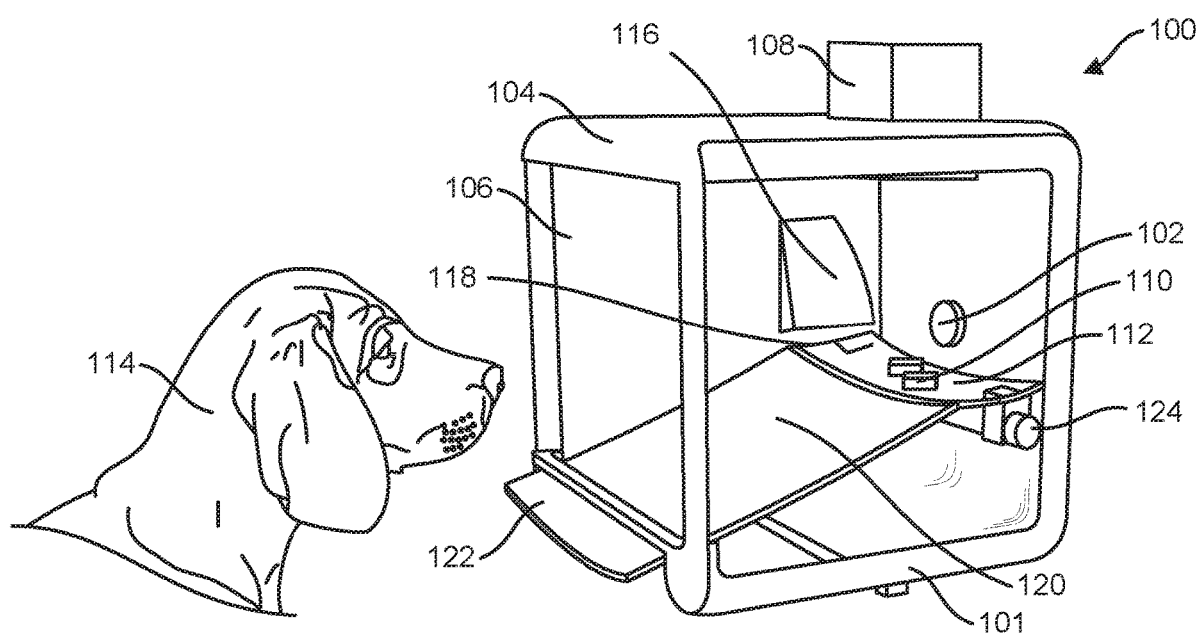
FIG. 2A is an isometric view of an example pet interaction device providing a view of a treat to a pet, according to an embodiment of the present invention.
Figure 2B:
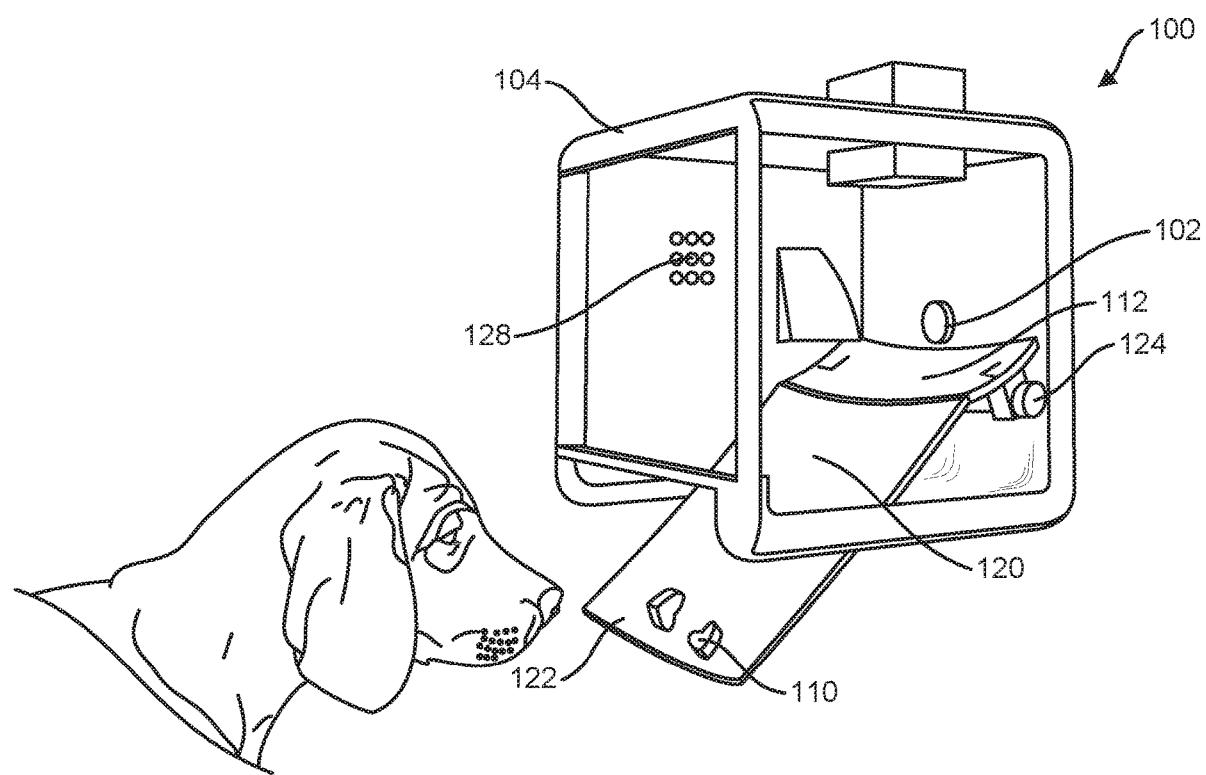
FIG. 2B is an isometric view of the example pet interaction device providing the treat to the pet.

FIG. 2A shows an example cutaway isometric view of a pet interaction device 100 as it displays a treat for a pet. In this example, the device 100 and its constituent components are contained within or attached to a housing that is substantially shaped as a rectangular prism. In the views of FIGS. 2A and 2B, a side wall 101 of the housing is cut away to reveal the internal components and workings of the device 100.

The device 100 includes a camera lens 102 of a webcam or cellphone that is positioned within a housing 104. The housing has an opening 106 in front and a remote-controlled treat dispenser 108 above. A treat staging area, in this example a treat platform 112, is positioned just below and in front of the camera lens 102 and in clear view of the opening 106. When the remote controlled treat dispenser 108 is activated, one or more treats 110 fall onto the platform 112 and are seen by the dog 114, at eye level to the camera lens 102, in front of the opening 106. The angled sides of the housing 116 and curved sides 118 of the treat platform 112 ensure that the treats do not bounce off of the treat platform. The opening 106 is typically filled with or covered by glass, plastic, or mesh to prevent the dog 114 from accessing the treat while it rests on the platform 112.

The sound of the treats 110 hitting the platform also may attract the dog's attention, directing its gaze towards the platform 112 and camera lens 102. A platform ramp 120 connects to the treat platform 112 and protrudes from underneath the opening 106 at a treat access area, in this example a treat dish 122. The platform ramp 120 and the treat platform 112 are connected to a spring loaded hinge 124.

FIG. 2B shows the example pet interaction device 100 after the pet has caused it to provide a treat. As shown in FIG. 2B, once the dog hears and sees the treats on the platform 112, he pushes the protruding treat dish 122 down, which tilts the treat platform ramp 120 and the treat platform 112 down, causing the treats to slide down the ramp 120 and into the treat dish 122, to be eaten in view of the camera lens 102.

Multiple repetitions train the dog to anticipate that once it sees the treats on the platform, it will get a treat. The dog will learn to look at the treat platform, and thus towards the camera, as it is waiting for its next treat. A conditioning sound, like a buzzer, bell, or speaker 128 before the treat is delivered, can further facilitate the anticipation and training of the dog to look towards the camera while waiting for its next treat.

A means to present the treat directly to the platform ramp 120 and treat dish 122 may also help in the initial training. For example, in some embodiments, the dispenser 108 may be configured to selectively drop a treat on the platform 112 or the ramp 120, such that the treat slides down into the dish 122. In other embodiments, the platform 112 and/or ramp 120 may be remotely controlled during initial training to tilt to slide the treat down the ramp 120 to the dish 122.

In some embodiments, the treat delivery function of the device can be controlled by a user operating a user input device. In some embodiments, the user input device may be a button or lever of the device 100. For example, the user may press a button on the housing 104, which in turn causes the treat dispenser to drop a treat onto the treat staging area. In other embodiments, the user input device may be a remote computing device. For example, the user may operate an app or similar program executing on a remote mobile device, such as a smart phone. A user operating the remote device can interact with the pet via the video camera and/or speaker of the device 100. The user can encourage the pet to perform a trick, and upon successful execution, the user can cause the delivery of a treat via the device 100.

Other treat delivery mechanisms are contemplated. For example, in some embodiments the device 100 includes a pet input device, such as a button, switch, or lever that can be pressed by the pet. When the pet presses the pet input device, the device 100 drops the treat onto a ramp or similar, causing the treat to become accessible to the pet, such as by landing in an external shelf, bowl, or dish.

Figure 3:
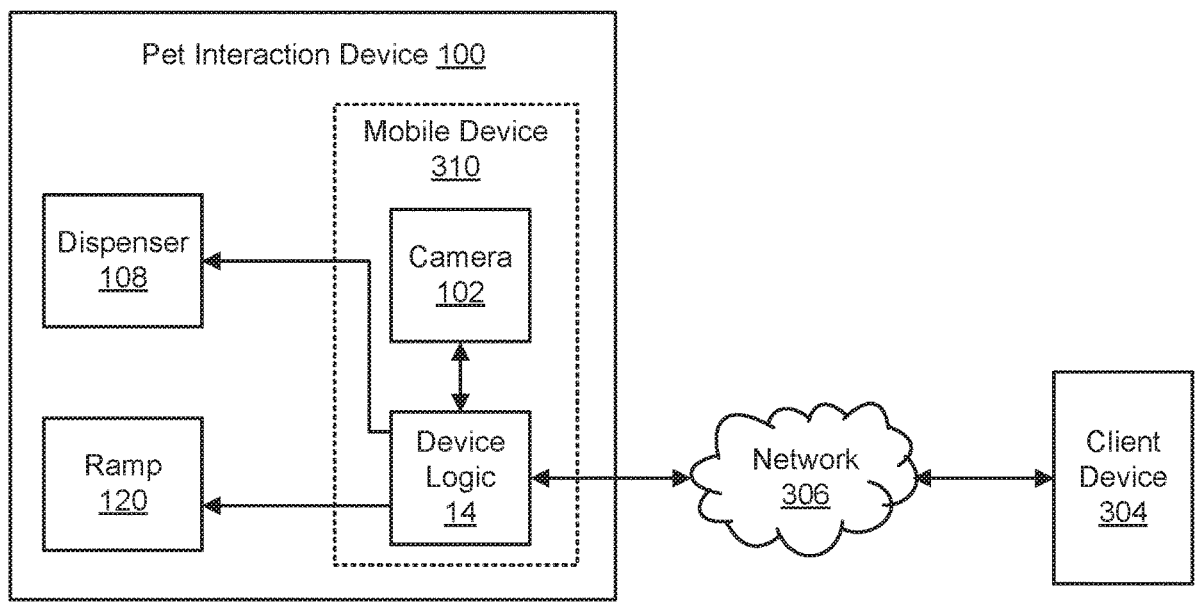
FIG. 3 is a block diagram showing components of an example pet interaction device.

FIG. 3 is a block diagram showing components of an example pet interaction device. FIG. 3 shows a pet interaction device 100 interacting via a network 306 with a remote client device 304, such as a smart phone, tablet, or remote control. The pet interaction device 100 includes the dispenser 108, ramp 120, and camera 102 as described above.

The pet interaction device 100 also includes logic 14. The logic 14 controls the camera 102, the treat dispenser 108, and the ramp 120. The logic 14 is also in communication via the network 306 (e.g., the Internet or a home network) with the client device 304. The logic 14 transmits data (e.g., audio, image, video) for display by an application or similar logic on the client device 304. The logic 14 also receives data and/or instructions from the client device 304. For example, a user of the client device 304 may transmit his voice to the logic 14, which in turn plays the audio on a speaker of the pet interaction device 100. As another example, the user may transmit a command to dispense a treat or activate the ramp in order to deliver a treat to the pet.

In some embodiments, the logic 14 and camera 102 are combined in a single package, such as a mobile device 310. For example, the pet interaction device 100 may be configured to receive and hold a mobile device such as a smart phone, tablet, or the like. Such a configuration may be advantageous because it will typically reduce the production cost of the pet interaction device 100, since this approach relies on the video, control, and communication features present in a (possibly surplus) smart phone or tablet provided by the user.

The pet interaction device 100 may include a means for physically coupling the mobile device 310 to the device 100. Such means may include hook and loop fastener straps or patches, clips, slots, or brackets. The logic 14 in the mobile device 310 is an app or other software executing thereon. The mobile device 310 may be plugged in (e.g., via USB connection) to the pet interaction device 100 to communicate with components of the device 100 and/or to receive power therefrom. Communication between the mobile device 310 and the pet interaction device 100 may be via wired (e.g., USB) or wireless (e.g., Bluetooth, Wi-Fi) connection.

The mobile device 310 is drawn as a dashed box to emphasize that there is no requirement that the camera 102 and logic 14 be provided by a mobile device 310. In other embodiments, those components may be permanently and separately integrated into the pet interaction device 100.

The pet interaction device may include additional input/output devices. One embodiment may provide a second camera, mounted to provide a view from the outside of the device. Another embodiment may provide a proximity sensor to detect when the pet is close to the pet interaction device. In response to detecting the presence of the pet, the device may take various actions, including notifying the user, such as by sending a message to the user's remote computing device. The pet interaction device may also or instead include a display screen, so that images of the user or other scenes can be displayed. In some embodiments, the screen is mounted inside of the pet interaction device to further hold the gaze or attention of the pet.

While various examples have been described above, combinations of one or more of the following features may be present in other embodiments. Some embodiments include a remote-controlled treat dispenser in proximity to the camera, such that the pet becomes conditioned to view the treat dispenser or it delivery target while waiting for a treat. Some embodiments include a treat platform, container, vessel, or the like, which is in proximity to the camera and to the treat dispenser and which has one or more of the following properties: it can reliably receive the treats from the dispenser; the treats are clearly displayed and can be easily seen by the dog; the treats can make a sound as they are delivered to the platform; it is close enough to the camera lens and positioned such that it causes the dog to look in; the general direction of the camera lens when the dog is looking at the treats on the platform; the platform does not obstruct the view of the dog; and there is a mechanism by which by which the platform and the housing can reliably direct the treats onto the platform without obstructing the view of the dog's face by the camera lens. Typical embodiments will also have a window or other barrier (e.g., mesh screen) separating the dog from the treat platform and camera.

Some embodiments include a mechanism that allows the dog to get the treat and does not block the view of the dog getting the treat or eating the treat. This mechanism might involve giving the dog access through the window or barrier to the treats on the platform. Alternatively, this mechanism might involve a means by which the treats are moved or released from the platform to a location not restricted by the window or barrier where the dog has direct access to the treats and which is still viewable by the camera.

Some embodiments provide a method to train the dog to anticipate that treats will be displayed on the platform before they are given to the dog, thereby training the dog to look towards the platform and the camera lens while they are waiting for treats. A buzzer, bell, or other output device (e.g., speaker on a coupled mobile computing device) sounding before the delivery of the treat to the treat platform can facilitate training. A means to alter the treat delivery closer to the dog's mouth can facilitate the initial training and facilitate the dog learning the actions needed to gain access to the treats (for example, pushing down the treat dish in the embodiment of FIGS. 2A and 2B).

Other embodiments may be used without a treat platform, for example, wherein the treat is dispensed directly onto a target area proximate the dispenser, perhaps engaging a sound or other signal to the dog, but which still allowing the camera to focus on the dog's face.

While embodiments herein are described using a dog as an example pet, the described devices and techniques may be used with other types of pets, such as cats. All of the patent and non-patent references cited herein are incorporated by reference in their entireties.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pet interaction device, comprising:
   a treat platform that is viewable by but not physically accessible to a pet;
   a camera having a lens that is directed to a pet viewing area;
   a treat dispenser configured to deliver a treat to the treat platform;
   control hardware that executes logic configured to, in response to a received command, cause the treat dispenser to deliver a treat to the treat platform, such that the camera will have a view of the pet as it gazes at the treat; and
   a ramp configured to transport a treat from the treat platform to a treat access area, wherein the treat platform is operable by the pet to cause a treat held by the platform to move onto the ramp, thereby causing the treat to slide down the ramp and into the treat access area; and
   a spring-loaded hinge that biases the treat platform into a substantially horizontal position, wherein the ramp has a first end and a second end, wherein the first end is fixedly connected to the treat platform, wherein downward pressure on the second end of the ramp causes the ramp to tilt downwards, thereby causing the treat to slide from the treat platform onto the ramp at the first end and towards the second end and into the treat access area.

2. The pet interaction device of claim 1, further comprising a pet input device that is operable by the pet and that, when operated, causes the ramp to move the treat from the treat platform to the treat access area.

3. The pet interaction device of claim 1, further comprising a user input device that is operable by a user and that, when operated, causes the ramp to move the treat from the treat platform to the treat access area.

4. The pet interaction device of claim 3, wherein the user input device is a manually operated interface connected to the treat dispenser.

5. The pet interaction device of claim 3, wherein the user input device is a remote computing device.

6. The pet interaction device of claim 1, further comprising an audio output device that is configured to produce a sound audible to the pet, wherein the sound notifies the pet of the presence of a treat on the treat platform.

7. The pet interaction device of claim 1, wherein the logic is configured to transmit at least one of audio or visual data obtained from the camera to a remote user device.

8. The pet interaction device of claim 7, wherein the logic is further configured to:
   receive at least one of audio or video of a user from the remote user device; and
   play at least one of the audio or video of the user via an audio/video output device of the pet interaction device.

9. The pet interaction device of claim 1, wherein the logic is further configured to:
   receive a command from a remote user device; and
   in response to the received command, cause the treat dispenser to deliver a treat to the treat platform.

10. A pet interaction device, comprising:
    a housing having an opening;
    a treat dispenser configured to deliver a treat to a shelf within the housing, wherein the shelf is visible from the outside by a pet that looks through the opening;
    a camera having a lens that is oriented to provide the camera with a view from the inside of the housing outwards through the opening;
    control hardware that executes logic configured to, in response to a received command, cause the treat dispenser to deliver a treat onto the shelf where it is visible to the pet through the opening, such that the camera will have a view of the pet as it gazes at the treat on the shelf;
    a ramp configured to transport a treat from the shelf to a treat access area, wherein the shelf is operable by the pet to cause a treat held by the shelf to move onto the ramp, thereby causing the treat to slide down the ramp and into the treat access area; and
    a spring-loaded hinge that biases the shelf into a substantially horizontal position, wherein the ramp has a first end and a second end, wherein the first end is fixedly connected to the shelf, wherein downward pressure on the second end of the ramp causes the ramp to tilt downwards, thereby causing the treat to slide from the shelf onto the ramp at the first end and towards the second end and into the treat access area.

11. The pet interaction device of claim 10, wherein the treat access area is a dish external to the housing configured to receive a treat provided by the treat dispenser, wherein the dish is positioned adjacent to the opening, such that a pet that eats a treat from the dish is visible through the opening to the camera.

12. The pet interaction device of claim 10, further comprising an input device that is operable by the pet and that, when operated, causes the ramp to move the treat from the shelf to the treat access area.

13. The pet interaction device of claim 10, further comprising an audio output device that is configured to produce a sound audible to the pet, wherein the sound notifies the pet of the presence of a treat on the shelf.

14. The pet interaction device of claim 10, wherein the logic is configured to transmit image data obtained from the camera to a remote client device.

15. The pet interaction device of claim 14, wherein the logic is further configured to:
    receive audio of a user's voice from the remote client device; and
    play the audio via an audio output device of the pet interaction device.

16. The pet interaction device of claim 14, wherein the logic is further configured to:
    receive a command from the remote client device; and
    in response to the received command, play a sound that notifies the pet of the presence of a treat on the shelf.

17. The pet interaction device of claim 14, wherein the logic is further configured to:
    receive a command from the remote client device; and
    in response to the received command, cause the treat dispenser to deliver a treat to the shelf.

18. The pet interaction device of claim 10, wherein the camera is part of a mobile computing device that is separate from the housing, wherein the housing includes a means for coupling the mobile computing device to the housing, such that the camera is positioned to view through the housing via an opening in the housing that is positioned opposite the opening in the housing.

19. The pet interaction device of claim 18, wherein at least some of the logic includes instructions executing on the mobile computing device.

20. The pet interaction device of claim 19, wherein the instructions are configured to control at least the treat dispenser and the camera.

21. The pet interaction device of claim 18, wherein the mobile computing device receives power from a power port of the pet interaction device.

22. A pet interaction device, comprising:
- a housing having an opening;
- a treat dispenser configured to deliver a treat to a shelf within the housing, wherein the shelf is visible from the outside by a pet that looks through the opening;
- a camera having a lens that is oriented to provide the camera with a view from the inside of the housing outwards through the opening;
- control hardware that executes logic configured to, in response to a received command, cause the treat dispenser to deliver a treat onto the shelf where it is visible to the pet through the opening, such that the camera will have a view of the pet as it gazes at the treat on the shelf;
- a ramp configured to eject a treat from the housing, wherein the shelf is operable by the pet to cause a treat held by the shelf to move onto the ramp, thereby causing the treat to slide down the ramp and onto a floor; and
- a spring-loaded hinge that biases the shelf into a substantially horizontal position, wherein the ramp has a first end and a second end, wherein the first end is fixedly connected to the shelf, wherein downward pressure on the second end of the ramp causes the ramp to tilt downwards, thereby causing the treat to slide from the shelf onto the ramp at the first end and towards the second end and onto the floor.

* * * * *